United States Patent
Shang et al.

(10) Patent No.: US 9,556,591 B2
(45) Date of Patent: Jan. 31, 2017

(54) HYDRAULIC SYSTEM RECOVERING SWING KINETIC AND BOOM POTENTIAL ENERGY

(71) Applicant: Caterpillar Inc., Peoria, IL (US)

(72) Inventors: Tonglin Shang, Bolingbrook, IL (US);
Jiao Zhang, Naperville, IL (US);
Pengfei Ma, Naperville, IL (US);
Dayao Chen, Bolingbrook, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 14/668,678

(22) Filed: Mar. 25, 2015

(65) Prior Publication Data
US 2016/0281330 A1    Sep. 29, 2016

(51) Int. Cl.
*E02F 9/22*    (2006.01)
*E02F 3/32*    (2006.01)
*E02F 9/20*    (2006.01)
*E02F 3/42*    (2006.01)

(52) U.S. Cl.
CPC .............. *E02F 9/2217* (2013.01); *E02F 3/32* (2013.01); *E02F 3/425* (2013.01); *E02F 9/2004* (2013.01); *E02F 9/2267* (2013.01); *E02F 9/2285* (2013.01)

(58) Field of Classification Search
None
See application file for complete search history.

(56) References Cited

U.S. PATENT DOCUMENTS

| 8,850,806 | B2 | 10/2014 | Zhang et al. |
| 2008/0110166 | A1 | 5/2008 | Stephenson et al. |
| 2009/0217653 | A1 | 9/2009 | Zhang et al. |
| 2013/0004278 | A1 | 1/2013 | Ma et al. |
| 2013/0098012 | A1 | 4/2013 | Opdenbosch |
| 2013/0152565 | A1 | 6/2013 | Ma et al. |
| 2013/0318955 | A1 | 12/2013 | Zhang et al. |

(Continued)

FOREIGN PATENT DOCUMENTS

| CN | 102912821 | 2/2013 |
| CN | 103556669 A | 2/2014 |

(Continued)

OTHER PUBLICATIONS

Morris, et al., U.S. Appl. No. 14/482,557, entitled "Machine Having Hydraulic Start Assist System," filed Sep. 10, 2014 (67 pages).

*Primary Examiner* — Thomas Tarcza
*Assistant Examiner* — Garrett Evans
(74) *Attorney, Agent, or Firm* — Miller, Matthias & Hull LLP

(57) ABSTRACT

Swing kinetic and boom potential energy may be recovered in a machine having a movable work tool, a swing motor for rotating the work tool, a hydraulic cylinder for raising and lowering the work tool, a pump selectively connected to the swing motor and the hydraulic cylinder, and a power source outputting power to drive the pump. The machine may further include a first accumulator, a swing charge valve having a charge set pressure, and a boom charge valve. The swing charge valve selectively fluidly connect the swing motor to the first accumulator, and open to fluidly connect the swing motor to the first accumulator when a swing motor fluid pressure is greater than a charge set pressure of the swing charge valve. The boom charge valve may selectively fluidly connect a head-end chamber of the hydraulic cylinder to the first accumulator when the work tool is lowered.

20 Claims, 5 Drawing Sheets

(56) References Cited

U.S. PATENT DOCUMENTS

| | | |
|---|---|---|
| 2014/0119867 A1 | 5/2014 | Wen et al. |
| 2014/0123633 A1 | 5/2014 | Rosth |
| 2014/0230420 A1 | 8/2014 | Ma et al. |
| 2014/0325975 A1 | 11/2014 | Kim et al. |

FOREIGN PATENT DOCUMENTS

| | | |
|---|---|---|
| CN | 103697023 A | 4/2014 |
| CN | 204199367 | 3/2015 |
| JP | 3452135 B2 | 9/2003 |
| WO | WO 2013/103777 A2 | 7/2013 |
| WO | WO 2014/115645 A1 | 7/2014 |
| WO | 2015021400 | 2/2015 |

HYDRAULIC SYSTEM RECOVERING SWING KINETIC AND BOOM POTENTIAL ENERGY

TECHNICAL FIELD

The present disclosure relates generally to electro-hydraulic control systems and, more particularly, to electro-hydraulic control systems for recovering and reusing swing kinetic energy and boom potential energy.

BACKGROUND

Hydraulic machines such as excavators, dozers, loaders, backhoes, motor graders, and other types of heavy equipment use one or more hydraulic actuators to accomplish a variety of tasks. These actuators are fluidly connected to an engine-driven pump of the machine that provides pressurized fluid to chambers within the actuators. As the pressurized fluid moves into or through the chambers, the pressure of the fluid acts on hydraulic surfaces of the chambers to affect movement of the actuators and a connected work tool.

Swing-type excavation machines, for example hydraulic excavators and front shovels, require significant hydraulic pressure and flow to transfer material from a dig location to a dump location. These machines direct the high-pressure fluid from an engine-driven pump through a swing motor to accelerate a loaded work tool at the start of each swing, and then restrict the flow of fluid exiting the motor at the end of each swing to slow and stop the work tool.

One problem associated with this type of hydraulic arrangement involves efficiency. In particular, the pressurized oil provided by the pump may slowly accelerate the work tool to its steady state swing speed, making the hydraulic system less responsive to the operator swing commands than is desirable to efficiently complete the required tasks. Moreover, the fluid exiting the swing motor at the end of each swing is under a relatively high pressure due to deceleration of the loaded work tool. Unless recovered, energy associated with the high-pressure fluid may be wasted. In addition, restriction of this high-pressure fluid exiting the swing motor at the end of each swing can result in heating of the fluid, which must be accommodated with an increased cooling capacity of the machine.

One attempt to recover swing kinetic energy in a swing-type machine is disclosed in U.S. Pat. No. 8,850,806 to Zhang et al. issued on Oct. 7, 2014 (the '806 patent). The '806 patent discloses a hydraulic control system for a machine that may have a work tool movable through segments of an excavation cycle, a motor configured to swing the work tool during the excavation cycle, at least one accumulator configured to selectively receive fluid discharged from the motor and to discharge fluid to the motor during the excavation cycle, and a controller. The controller may be configured to receive input regarding a current excavation cycle of the work tool, and make a determination based on the input that the current excavation cycle is associated with one of a set of known modes of operation. The controller may be further configured to cause the at least one accumulator to receive fluid by actuating an electro-hydraulic charging valve, and to discharge fluid by actuating an electro-hydraulic discharge valve, during different segments of the excavation cycle based on the determination. The arrangement with two electro-hydraulic valves provides flexibility in design as the performance of the valves is tuned to the particular machine in which the hydraulic control system is implemented. The discharge valve discharges recovered energy in the accumulator directly back to the swing motor during swing acceleration. However, swing acceleration performance can vary based on the pressure within the accumulator at a given time. Moreover, the discharge valve cannot be opened during charging portions of the excavation cycle, so excess kinetic energy may be wasted or lost once the accumulator is fully charged. Therefore, opportunities exist for providing energy recovery systems in swing-type machines that provide more consistent performance in swing acceleration, are more portable between different sizes and types of machines, and are more efficient at capturing kinetic energy.

The swing-type elevation machines (e.g., excavators, front shovels, backhoes, etc.) and other non-swing-type elevation machines (e.g., wheel loaders, bulldozers, telehandlers, etc.) may be used to move heavy loads, such as earth, construction material, and/or debris, and may utilize an implements to move the loads. The implements may be powered by hydraulic systems that similarly use pressurized fluid to actuate a hydraulic actuator to lift the implement. During operation of a lifting machine, the implement with or without a load of material may be raised to an elevated position. As the implement and the load may be relatively heavy, the implement may gain potential energy when raised to the elevated position. As the implement is released from the elevated position, this potential energy may be converted to heat when pressurized hydraulic fluid is forced out of the hydraulic actuator and is throttled across a valve and returned to a tank. The conversion of potential energy into heat may result in an undesired heating of the discharged hydraulic fluid, which may require that the machine possess additional cooling capacity. However, recovering that lost or wasted potential energy for reuse in the hydraulic system may improve the machine's efficiency.

An energy recovery system having integrated boom and swing circuits is disclosed in U.S. Pat. Appl. Publ. No. 2014/0119867 to Wen et al. published on May 1, 2014 (the '867 publication). The '867 publication discloses an energy recovery system that may have a boom circuit with at least a one linear actuator configured to move a work tool, and a boom accumulator configured to selectively collect pressurized fluid from the at least one linear actuator and to discharge pressurized fluid back to the at least one linear actuator. The energy recovery system may also have a swing circuit with a swing motor configured to move the work tool, and a swing accumulator configured to selectively collect pressurized fluid from the swing motor and discharge pressurized fluid back to the swing motor. The energy recovery system may further have a common supply passage extending between the swing and boom circuits to connect discharge passages, and a combiner valve may be disposed within a common supply passage. The combiner valve may be selectively moved to combine the outputs of pumps of the circuits to provide supply fluid for only the swing circuit, for only the boom circuit, or for both the swing and the boom circuits. A common return passage may also extend between the swing and boom circuits, and may connect the return passages of the swing circuit and the boom circuit. In this manner, a makeup accumulator may be filled with fluid from both circuits and, likewise, the makeup accumulator may provide fluid to both circuits. In such systems, the swing circuit and the boom circuit work independently with separate motors and accumulators. The circuits show improved efficiency when integrated as taught by the '867 publication, but may be more difficult to implement in smaller machines due to the package size required for the motors and accumulators. In view of this, opportunities exist for integrating boom and swing circuits in a manner that is portable between the machines in which the energy recovery system may be implemented.

SUMMARY OF THE DISCLOSURE

In one aspect of the present invention, a machine is disclosed. The machine may include a work tool movable through a range of motion, a swing motor configured to swing the work tool about a vertical axis, a hydraulic cylinder having a head-end chamber and being configured to raise and lower the work tool, a pump selectively fluidly connected to the swing motor and to the hydraulic cylinder to provide pressurized fluid to cause the swing motor to swing the work tool and to cause the hydraulic cylinder to raise and lower the work tool, and a power source operatively connected to the pump to output power to drive the pump. The machine may further include a first accumulator, a swing charge valve having a normally closed position, an open position, and a charge set pressure, and a boom charge valve having a normally closed position and an open position. The swing charge valve may be positioned to selectively fluidly connect the swing motor to the first accumulator, and may move from the normally closed position to the open position and fluidly connect the swing motor to the first accumulator when a swing motor fluid pressure communicated to the swing charge valve from the swing motor is greater than the charge set pressure. The boom charge valve may be position to selectively fluidly connect the head-end chamber of the hydraulic cylinder to the first accumulator.

In another aspect of the present invention, a method for recovering swing kinetic energy and boom potential energy in a hydraulic system of a machine is disclosed. The method may include providing pressurized fluid to a swing motor to cause the swing motor to swing a work tool of the machine about a vertical axis, providing pressurize fluid to a hydraulic cylinder having a head-end chamber to cause the hydraulic cylinder to raise and lower the work tool, and sensing a fluid pressure from the swing motor at a swing charge valve. The method may further include opening the swing charge valve to fluidly connect the swing motor to a first accumulator in response to the sensed fluid pressure from the swing motor being greater than or equal to a charge set pressure of the swing charge valve and causing the swing charge valve to move from a normally closed position toward an open position, detecting actuation of an operator input device, and opening a boom charge valve to fluidly connect the head-end chamber to the first accumulator in response to determining that an actuation of the operator input device corresponds to a command to lower the work tool.

In a further aspect of the present disclosure, an energy recovery system for a machine is disclosed. The machine may have a work tool movable through a range of motion, a swing motor configured to swing the work tool about a vertical axis, a hydraulic cylinder having a head-end chamber and being configured to raise and lower the work tool, a pump selectively fluidly connected to the swing motor and the hydraulic cylinder to provide pressurized fluid to cause the swing motor to swing the work tool and to cause the hydraulic cylinder to raise and lower the work tool, a power source operatively connected to the pump to output power to drive the pump, and a controller. The energy recovery system may include a first accumulator, a swing charge valve having a normally closed position, an open position, and a charge set pressure, and a boom charge valve operatively connected to the controller and having a normally closed position and an open position. The swing charge valve may be positioned to selectively fluidly connect the swing motor to the first accumulator, and the swing charge valve may move from the normally closed position to the open position and fluidly connect the swing motor to the first accumulator when a swing motor fluid pressure communicated to the swing charge valve from the swing motor is greater than the charge set pressure. The boom charge valve may be positioned to selectively fluidly connect the head-end chamber of the hydraulic cylinder to the first accumulator.

Additional aspects are defined by the claims of this patent.

DETAILED DESCRIPTION

Figure 1:
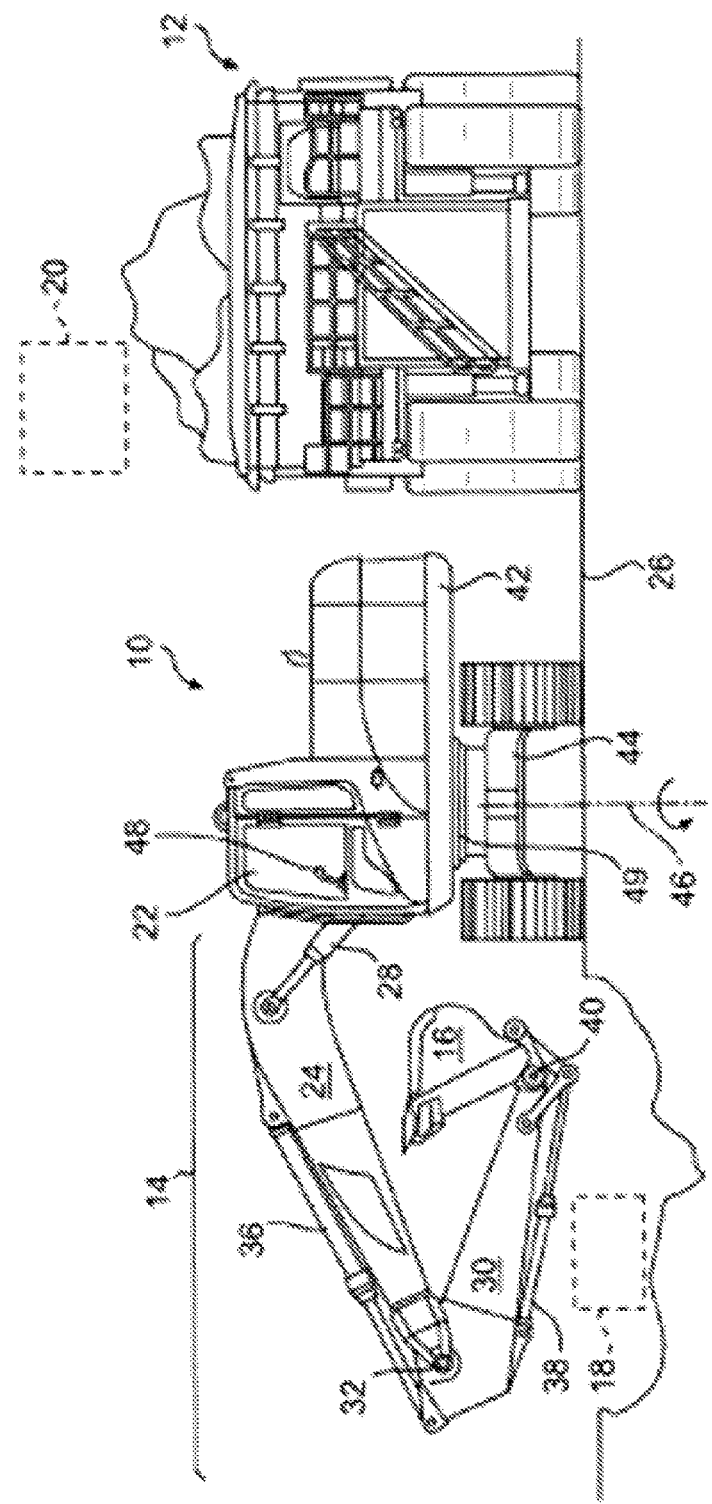
FIG. 1 is a diagrammatic illustration of an exemplary disclosed machine operating at a worksite with a haul vehicle and in which swing kinetic energy and boom potential energy may be recovered and reused in accordance with the present disclosure.

FIG. 1 illustrates an exemplary machine 10 having multiple systems and components that cooperate to excavate, carry, scoop, or otherwise move material, and, in one example, load material onto a nearby haul vehicle 12 (or another dump/unload location of material). In the depicted example, the machine 10 is a hydraulic excavator. It is contemplated, however, that the machine 10 could alternatively embody another excavation, loading, or material handling machine, such as a wheel loader, a backhoe, a front shovel, a dragline excavator, a crane, or another similar machine. The machine 10 may include, among other things, a hydraulic system 14 configured to move a work tool 16, such as a bucket in the depicted example, through a range of motion between a dig location 18 within a trench or at a pile, and a dump location 20, for example over the haul vehicle 12. The machine 10 may also include an operator station 22 for manual control of the hydraulic system 14. It is contemplated that the machine 10 may perform operations other than truck loading, if desired, such as craning, trenching, material transport and/or removal, and material handling.

The hydraulic system 14 may include a linkage structure acted on by fluid actuators to move the work tool 16. Specifically, the hydraulic system 14 may include a boom 24 that is vertically pivotal relative to a work surface 26 by a pair of adjacent, double-acting, hydraulic boom cylinders 28 (only one shown in FIG. 1). The hydraulic system 14 may also include a stick 30 that is vertically pivotal about a horizontal pivot axis 32 relative to the boom 24 by a single, double-acting, hydraulic stick cylinder 36. The hydraulic system 14 may further include a single, double-acting, hydraulic bucket cylinder 38 that is operatively connected to the work tool 16 to tilt the work tool 16 vertically about a horizontal pivot axis 40 relative to the stick 30. The boom 24 may be pivotally connected to a frame 42 of the machine 10, while the frame 42 may be pivotally connected to an undercarriage member 44 and swung about a vertical axis 46 by one or more swing motors 49. The stick 30 may pivotally connect the work tool 16 to the boom 24 by way of the pivot axes 32 and 40. It is contemplated that a greater or lesser number of fluid actuators may be included within the hydraulic system 14 and connected in a manner other than described above, if desired.

Numerous different work tools 16 may be attachable to a single machine 10 and controllable via the operator station 22. The work tool 16 may include any device used to perform a particular task such as, for example, a bucket, a fork arrangement, a blade, a shovel, a crusher, a shear, a grapple, a grapple bucket, a magnet, or any other task-performing device known in the art. Although connected in the embodiment of FIG. 1 to lift, swing, and tilt relative to the machine 10, the work tool 16 may alternatively or additionally rotate, slide, extend, open and close, or move in another manner known in the art.

The operator station 22 may be configured to receive input from a machine operator indicative of a desired work tool movement. Specifically, the operator station 22 may include one or more input devices 48 embodied, for example, as single or multi-axis joysticks located proximal an operator seat (not shown). The input devices 48 may be proportional-type controllers configured to position and/or orient the work tool 16 by producing a work tool position signal that is indicative of a desired work tool speed and/or force in a particular direction. The position signal may be used to actuate any one or more of the hydraulic cylinders 28, 36, 38 and/or swing motor(s) 49. It is contemplated that different or additional input devices 48 may alternatively or additionally be included within the operator station 22 and configured to control the movement and/or operation of the machine 10 and the systems thereof, such as, for example, wheels, knobs, push-pull devices, switches, pedals, and other operator input devices known in the art.

Figure 2:
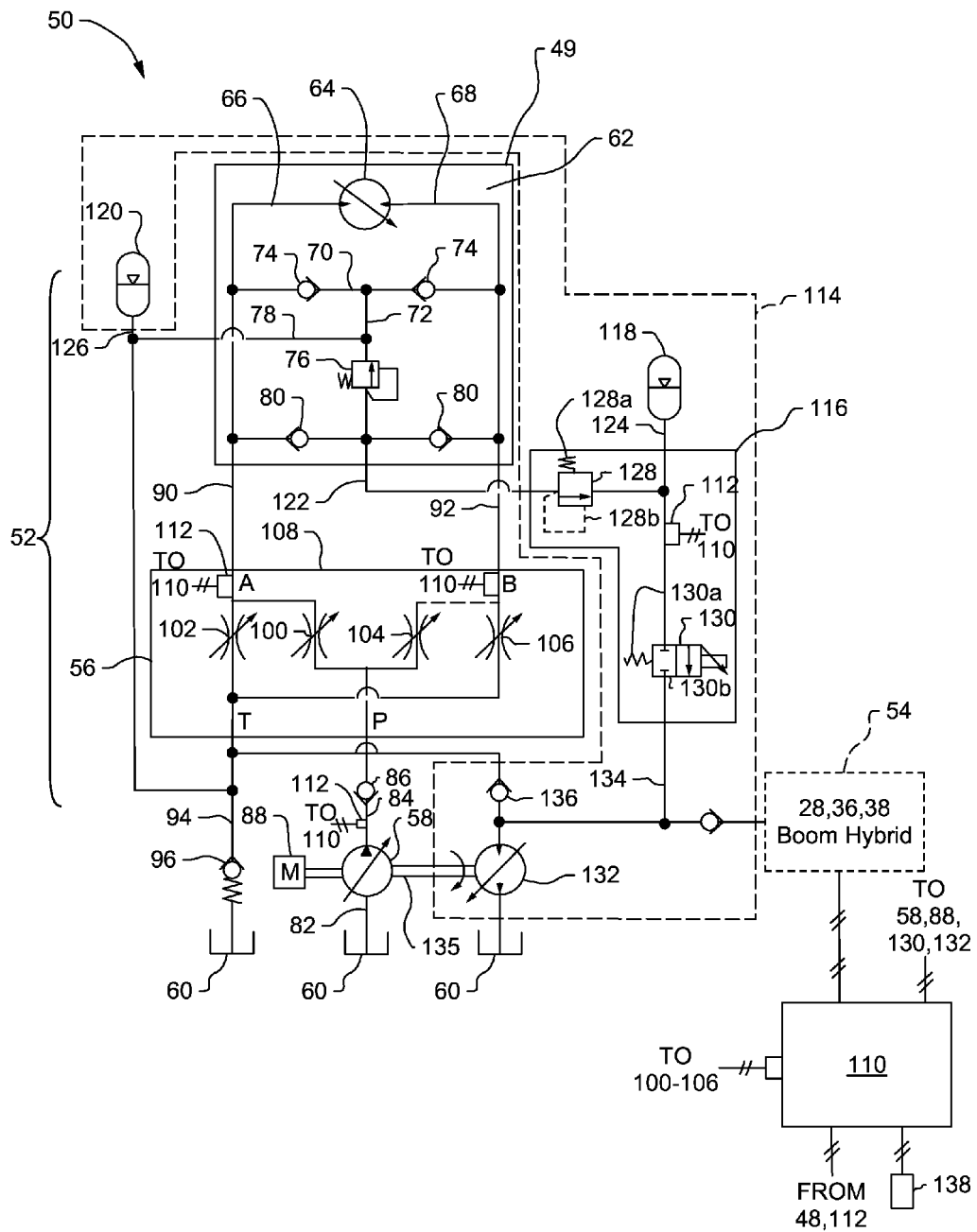
FIG. 2 is a schematic illustration of a hydraulic system with a swing circuit having swing kinetic energy recovery in accordance with the present disclosure.

As illustrated in FIG. 2, the machine 10 may include a hydraulic control system 50 having a plurality of fluid components that cooperate to move the hydraulic system 14 (referring to FIG. 1). In particular, the hydraulic control system 50 may include a first or swing hybrid circuit 52 associated with the swing motor 49, and at least a second or boom hybrid circuit 54 associated with the hydraulic cylinders 28, 36, 38. The first circuit 52 may include, among other things, a swing control valve 56 connected to regulate a flow of pressurized fluid from a pump 58 to the swing motor 49 and from the swing motor 49 to a low-pressure fluid reservoir or tank 60 to cause a swinging movement of the work tool 16 about the axis 46 (referring to FIG. 1) in accordance with an operator request received via the input device 48. The second circuit 54 may include similar control valves, for example a boom control valve (not shown), a stick control valve (not shown), a tool control valve (not shown), a travel control valve (not shown), and/or an auxiliary control valve connected in parallel to receive pressurized fluid from the pump 58 and to discharge waste fluid to the tank 60, thereby regulating the corresponding actuators (e.g., hydraulic cylinders 28, 36, 38). Alternatively, the second circuit 54 may have its own pump (not shown).

The swing motor 49 may include a housing 62 at least partially forming a first and a second chamber (not shown) located to either side of an impeller 64. When the first chamber is connected to an output of the pump 58 (e.g., via a first chamber passage 66 formed within the housing 62) and the second chamber is connected to the tank 60 (e.g., via a second chamber passage 68 formed within the housing 62), the impeller 64 may be driven to rotate in a first direction (shown in FIG. 2). Conversely, when the first chamber is connected to the tank 60 via the first chamber passage 66 and the second chamber is connected to the pump 58 via the second chamber passage 68, the impeller 64 may be driven to rotate in an opposite direction (not shown). The flow rate of fluid through the impeller 64 may relate to a rotational speed of the swing motor 49, while a pressure differential across the impeller 64 may relate to an output torque thereof.

The swing motor 49 may include built-in makeup and relief functionality. In particular, a makeup passage 70 and a relief passage 72 may be formed within the housing 62, between the first chamber passage 66 and the second chamber passage 68. A pair of opposing check valves 74 and a relief valve 76 may be disposed within the makeup and relief passages 70, 72, respectively. A low-pressure return passage 78 may be connected to each of the makeup and relief passages 70, 72 at locations between the check valves 74 and at an outlet of the relief valve 76 and a second pair of opposing check valves 80 connecting an inlet and pilot line of the relief valve 76 to the first and second chamber passages 66, 68. Based on a pressure differential between the low-pressure return passage 78 and the first and second chamber passages 66, 68, one of the check valves 74 may open to allow fluid from the low-pressure return passage 78 into the lower-pressure one of the first and second chambers. Similarly, based on a pressure differential between the first and second chamber passages 66, 68 and the low-pressure return passage 78, the relief valve 76 may open to allow fluid from the higher-pressure one of the first and second chambers into the low-pressure return passage 78. A significant pressure differential may generally exist between the first and second chambers during a swinging movement of the hydraulic system 14.

The pump 58 may be configured to draw fluid from the tank 60 via an inlet passage 82, pressurize the fluid to a desired level, and discharge the fluid to the first and second circuits 52, 54 via a discharge passage 84. A check valve 86 may be disposed within discharge passage 84, if desired, to provide for a unidirectional flow of pressurized fluid from the pump 58 into the first and second circuits 52, 54. The pump 58 may embody, for example, a variable displacement pump (shown in FIG. 2), a fixed displacement pump, or another source known in the art. The pump 58 may be drivably connected to a power source 88 of the machine 10. The power source 88 may embody an engine such as, for example, a diesel engine, a gasoline engine, a gaseous fuel-powered engine, or any other type of combustion engine known in the art. It is contemplated that the power source 88 may alternatively embody a non-combustion source of power such as a fuel cell, a power storage device, or another source known in the art. The power source 88 may produce a mechanical or electrical power output that may then be converted to hydraulic power for rotating the impeller 64 (and/or other hydraulic actuators) and/or one or more pumps as described below.

The pump 58 may be drivably connected to the power source 88 by, for example, a countershaft (not shown), a belt (not shown), an electrical circuit (not shown), or in another suitable manner. Alternatively, the pump 58 may be indirectly connected to the power source of the machine 10 via a torque converter, a reduction gear box, an electrical circuit, or in any other suitable manner. The pump 58 may produce a stream of pressurized fluid having a pressure level and/or a flow rate determined, at least in part, by demands of the actuators within the first and second circuits 52, 54 that correspond with operator requested movements. The discharge passage 84 may be connected within the first circuit 52 to the first and second chamber passages 66, 68 via the swing control valve 56 and the first and second chamber conduits 90, 92, respectively, which extend between the swing control valve 56 and the swing motor 49.

The tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic systems within the machine 10 may draw fluid from and return fluid to the tank 60. It is contemplated that the hydraulic control system 50 may be connected to multiple separate fluid tanks or to a single tank, as desired. The tank 60 may be fluidly connected to the swing control valve 56 via a drain passage 94, and to the first and second chamber passages 66, 68 via the swing control valve 56 and the first and second chamber conduits 90, 92, respectively. The tank 60 may also be connected to the low-pressure return passage 78. A back pressure valve 96 may be disposed within the drain passage 94, if desired, to promote a unidirectional flow of fluid into the tank 60.

The swing control valve 56 may have an element or elements that are movable to control the rotation of the swing motor 49 and corresponding swinging motion of the hydraulic system 14. Specifically, the swing control valve 56 may include a first chamber supply element 100, a first chamber drain element 102, a second chamber supply element 104, and a second chamber drain element 106 all disposed within a common block or housing 108. The first and second chamber supply elements 100, 104 may be connected in parallel with the discharge passage 84 to regulate filling of their respective chambers with fluid from pump 58, while the first and second chamber drain elements 102, 106 may be connected in parallel with the drain passage 94 to regulate draining of the respective chambers of fluid.

To drive the swing motor 49 to rotate in a first direction (shown in FIG. 2), the first chamber supply element 100 may be shifted to allow pressurized fluid from the pump 58 to enter the first chamber of the swing motor 49 via the discharge passage 84 and the first chamber conduit 90, while the second chamber drain element 106 may be shifted to allow fluid from the second chamber of the swing motor 49 to drain to the tank 60 via the second chamber conduit 92 and the drain passage 94. To drive the swing motor 49 to rotate in the opposite direction, the second chamber supply element 104 may be shifted to communicate the second chamber of the swing motor 49 with pressurized fluid from the pump 58, while the first chamber drain element 102 may be shifted to allow draining of fluid from the first chamber of the swing motor 49 to the tank 60.

It is contemplated that both the supply and drain functions of the swing control valve 56 (i.e., of the four different supply and drain elements) may alternatively be performed by a single valve element associated with the first chamber and a single valve element associated with the second chamber or by a single valve element associated with both the first and second chambers, if desired. The swing control valve 56 may include an independent metering valve unit, including two pump-to-motor ("P-M") independent metering control valves 100, 104 and two motor-to-tank ("M-T") independent metering control valves 102, 106. The P-M and M-T independent metering control valves 100, 102, 104, 106 may each be independently actuated into open and closed conditions, and positions between open and closed. Through selective actuation of the P-M and M-T control valves 100, 102, 104, 106, pressurized hydraulic fluid may be directed into and out of the first and second chambers of the swing motor 49. By controlling the direction and rate of fluid flow to and from the swing motor 49, the P-M and M-T control valves 100, 102, 104, 106 may control the motion of the hydraulic system 14. Additionally or alternatively, the swing control valve 56 may include one or more single spool or split spool valves (not shown), proportional control valves, or any other suitable devices configured to control the rate of pressurized hydraulic fluid flow entering into and exiting out of the swing motor 49.

The supply and drain elements 100, 102, 104, 106 of the swing control valve 56 may be solenoid-movable against a spring bias in response to a flow rate command issued by a controller 110. In particular, the swing motor 49 may rotate at a velocity that corresponds with the flow rate of fluid into and out of the first and second chambers. Accordingly, to achieve an operator-desired swing velocity, a command based on an assumed or measured pressure may be sent to the solenoids (not shown) of the supply and drain elements 100, 102, 104, 106 that causes the elements 100, 102, 104, 106 to open an amount corresponding to the necessary flow rate through the swing motor 49. This command may be in the form of a flow rate command or a valve element position command that is issued by controller 110.

The controller 110 may be in communication with the different components of hydraulic control system 50 to regulate operations of machine 10. For example, the controller 110 may be in communication with the input device (s) 48 in the operator station 22, with the elements of the swing control valve 56 in the first circuit 52 and with the elements of control valves (not shown) associated with the second circuit 54. Based on various operator input and monitored parameters, as will be described in more detail below, the controller 110 may be configured to selectively activate the different control valves in a coordinated manner to efficiently carry out operator requested movements of the hydraulic system 14.

The controller 110 may include a memory, a secondary storage device, a clock, and one or more processors that cooperate to accomplish a task consistent with the present disclosure. Numerous commercially available microprocessors can be configured to perform the functions of controller 110. It should be appreciated that controller 110 could readily embody a general machine controller capable of controlling numerous other functions of machine 10. Various known circuits may be associated with controller 110, including signal-conditioning circuitry, communication circuitry, and other appropriate circuitry. It should also be appreciated that controller 110 may include one or more of an application-specific integrated circuit (ASIC), a field-programmable gate array (FPGA), a computer system, and a logic circuit configured to allow controller 110 to function in accordance with the present disclosure.

The operational parameters monitored by the controller 110, in one embodiment, may include a pressure of fluid within the first and/or second circuits 52, 54. For example, one or more pressure sensors 112 may be strategically located within the first chamber and/or second chamber conduits 90, 92 to sense a pressure of the respective passages and generate a corresponding signal indicative of the pressure directed to the controller 110. It is contemplated that any number of pressure sensors 112 may be placed in any location within the first and/or second circuits 52, 54, as desired. It is further contemplated that other operational parameters such as, for example, speeds, temperatures, viscosities, densities, etc. may also or alternatively be monitored and used to regulate operation of the hydraulic control system 50, if desired.

The hydraulic control system 50 may be fitted with an energy recovery system 114 that is in communication with at least the first circuit 52 and configured to selectively extract and recover energy from waste fluid that is discharged from the swing motor 49. The energy recovery system 114 may include, among other things, a recovery valve block 116 that is fluidly connectable between the pump 58 and the swing motor 49, a high-pressure fluid reservoir such as a first accumulator 118 configured to selectively communicate with the swing motor 49 via the recovery valve block 116, and a second accumulator 120 also configured to selectively communicate with the swing motor 49. In the disclosed embodiment, the recovery valve block 116 may be fixedly and mechanically connectable to one or both of the swing control valve 56 and the swing motor 49, for example directly to the housing 62 and/or directly to the housing 108. The recovery valve block 116 may include a charge passage 122 fluidly connected to the relief valve 76, and fluidly connectable to the first chamber conduit 90 by a corresponding one of the check valves 80, and to the second chamber conduit 92 by the other of the check valves 80. The first accumulator 118 may be fluidly connected to the recovery valve block 116 via a first accumulator conduit 124, while the second accumulator 120 may be fluidly connectable to the passages 78, 94, in parallel with the tank 60, via a second accumulator conduit 126.

The first and second accumulators 118, 120 may each embody pressure vessels filled with a compressible gas that are configured to store pressurized fluid for future use by swing motor 49. The compressible gas may include, for example, nitrogen, argon, helium, or another appropriate compressible gas. As fluid in communication with the first and second accumulators 118, 120 exceeds predetermined pressures of the first and second accumulators 118, 120, the fluid may flow into the accumulators 118, 120. Because the gas therein is compressible, it may act like a spring and compress as the fluid flows into the first and second accumulators 118, 120. When the pressure of the fluid within the conduits 124, 126 drops below the predetermined pressures of the first and second accumulators 118, 120, the compressed gas may expand and urge the fluid from within the first and second accumulators 118, 120 to exit. It is contemplated that the first and second accumulators 118, 120 may alternatively embody membrane/spring-biased or bladder types of accumulators, if desired.

In the disclosed embodiment, the first accumulator 118 may be a larger (i.e., about 5-20 times larger) and higher-pressure (i.e., about 5-60 times higher-pressure) accumulator, as compared to the second accumulator 120. Specifically, the first accumulator 118 may be configured to accumulate up to about 50-100 L (about 1.766-3.531 cubic feet) of fluid having a pressure in the range of about 260-300 bar, while the second accumulator 120 may be configured to accumulate up to about 10 L (about 0.3531 cubic feet) of fluid having a pressure in the range of about 5-30 bar. In this configuration, the first accumulator 118 may be used primarily to assist the power source 88 to meet the power demands for motion of the swing motor 49 and to improve machine efficiencies, while the second accumulator 120 may be used primarily as a makeup accumulator to help reduce a likelihood of voiding at the swing motor 49 by providing fluid through a corresponding one of the check valves 74 when pressure in one of the first and second chamber conduits 90, 92 is less than the pressure in the low-pressure return passage 78. It is contemplated, however, that other volumes and pressures may be accommodated by the first and/or second accumulators 118, 120, if desired.

The recovery valve block 116 may house a swing charge valve 128 associated with the first accumulator 118, and a discharge valve 130 associated with the first accumulator 118 and disposed in parallel with the swing charge valve 128. The check valves 80 may selectively fluidly communicate one of the first and second chamber conduits 90, 92 via the charge passage 122 with the swing charge valve 128 based on the pressure differential between the first and second chamber conduits 90, 92 and the charge passage 122. The discharge valve 130 may be movable in response to commands from the controller 110 to selectively fluidly communicate the first accumulator 118 with an assist motor 132 of the energy recovery system 114 that is fluidly connected to the recovery valve block 116 by a discharge passage 134. The energy recovered by the energy recovery system 114 may be used to provide power for subsequent movements and operations of the swing motor 49 and/or other hydraulic actuators of the machine 10.

The swing charge valve 128 may be a pilot-operated two-way valve that is moveable in response to the fluid pressure in the charge passage 122 (i.e., in response to fluid pressures within the first and second chamber conduits 90, 92 and communicated through the check valves 80). In particular, the swing charge valve 128 may include a valve element (not shown) that is biased toward a normally closed position by a spring 128a at which fluid flow from the charge passage 122 to the first accumulator 118 is inhibited. The valve element can move toward an open position at which the charge passage 122 is fluidly connected to the first accumulator 118 when the fluid pressure in one of the first and second chamber conduits 90, 92 and sensed by the swing charge valve 128 via a pilot line 128b acting opposite the spring 128a exceeds a charge set pressure of the swing charge valve 128 that is set by the force applied by the spring 128a. Those skilled in the art will understand that other pilot-operated two-way valves in the various embodiments described herein, such as the relief valve 76, may operate in a similar manner with a set pressure dictated by a spring and a pilot pressure applied opposite the spring via a pilot line. When the valve element is away from the normally closed position (i.e., in the open position or in another position between the normally closed position and the open position) and a fluid pressure within the charge passage 122 exceeds a fluid pressure within the first accumulator 118, fluid from the charge passage 122 may fill (i.e., charge) the first accumulator 118 until the fluid pressure in the first accumulator 118 reaches the lesser of the fluid pressure in the charge passage 122 and a first accumulator maximum charge pressure.

The discharge valve 130 may be a solenoid-operated, variable position, two-way valve that is movable in response to a command from the controller 110 to allow fluid from the first accumulator 118 to enter the discharge passage 134 (i.e., to discharge). In particular, the discharge valve 130 may include a valve element (not shown) that is movable from a normally closed position at which fluid flow from the first accumulator 118 into the discharge passage 134 is inhibited, toward an open position at which the first accumulator 118 is fluidly connected to the discharge passage 134. When the valve element is away from the normally closed position (i.e., in the open position or in another position between the first and second positions) and a fluid pressure within the first accumulator 118 exceeds a fluid pressure within discharge passage 134, fluid from the first accumulator 118 may flow into the discharge passage 134 and to the assist motor 132 such that pressurized hydraulic fluid in the first accumulator 118 may produce a mechanical energy output (i.e., to assist driving the pump 58). The valve element of the discharge valve 130 may be biased by a spring 130a toward the normally closed position and movable by an actuator 130b in response to a command from controller 110 to any position between the normally closed position and the open position to thereby vary a flow rate of fluid from the first accumulator 118 to the assist motor 132. Those skilled in the art will understand that other solenoid-operated two-way valves in the various embodiments described herein may operate in a similar manner with a spring biasing a valve element toward a normal position and an actuator controlled by the controller 110 to move the valve element against the biasing force of the spring.

An additional pressure sensor 112 may be associated with the first accumulator 118 and configured to generate signals indicative of a first accumulator charge pressure of fluid within the first accumulator 118, if desired. In the disclosed embodiment, the additional pressure sensor 112 may be disposed between the first accumulator 118 and the discharge valve 130. It is contemplated, however, that the additional pressure sensor 112 may alternatively be disposed between the first accumulator 118 and the swing charge valve 128 or directly connected to first accumulator 118 at the first accumulator conduit 124, if desired. Signals from the additional pressure sensor 112 may be directed to the controller 110 for use in regulating operation of the discharge valve 130 as described herein.

The assist motor 132 may be a variable-displacement motor mechanically coupled to the power source 88 and/or the pump 58. The assist motor 132 may be configured to receive pressurized fluid from the first accumulator 118 and discharge the fluid into the tank 60. The assist motor 132 may use the energy contained within the pressurized fluid to generate a mechanical energy output that is added to the mechanical energy output of the power source 88 to drive the pump 58 and/or other components of the machine 10. For example, as shown in FIG. 2, the assist motor 132 may be operatively connected to an output shaft 135 of the power source 88, and the pump 58 may also be operatively connected to the output shaft 135. Alternatively, the pump 58 may be connected to the power source 88 via another mechanical arrangement, such as one or more mechanical connectors, e.g., gears, shafts, couplers, etc. Moreover, the output shaft 135 may be operatively connected and providing power to a pump or pumps providing pressurized fluid to the cylinders 28, 36, 38 in the second circuit 54 or other circuits of the hydraulic control system 50.

The energy recovery system 114 may also include the second accumulator 120 and a check valve 136. In an embodiment, the second accumulator 120 may be selectively operatively connected to the impeller 64 of the swing motor 49 via the relief passage 72, the makeup passage 70 and the check valves 74, and to the first and second chamber passages 66, 68. Provision of pressurized fluid from the second accumulator 120 to prevent voiding in the swing motor 49 was discussed above. In contrast, when fluid pressure builds up in one of the first and second chamber conduits 90, 92 during braking of the swing motor 49 that exceeds the relief set pressure of the relief valve 76, the relief valve 76 may move to an open position, thus allowing the over-pressurized hydraulic fluid in the corresponding chamber passage 66, 68 to enter (or charge) the second accumulator 120 through the second accumulator conduit 126. Thus, hydraulic fluid from the swing motor may be stored in the second accumulator 120 for reuse at a later time.

The back pressure valve 96 may allow passage of pressurized hydraulic fluid back into the tank 60, e.g., to regulate the pressure of pressurized hydraulic fluid stored within the second accumulator 120. For example, as previously described, pressurized hydraulic fluid in the first and second chamber conduits 90, 92 may be directed through the relief valve 76 and towards the second accumulator 120, thus creating pressure within the second accumulator 120 as pressurized hydraulic fluid is stored therein. As long as the pressure in the second accumulator 120 remains below a predetermined maximum back pressure that is required to force the back pressure valve 96 to an open position, the second accumulator 120 may continue to store more pressurized hydraulic fluid and the pressure in the second accumulator 120 may continue to steadily increase. However, once the pressure within the second accumulator 120 exceeds the maximum back pressure, the back pressure valve 96 may be forced into an open position, thus allowing the pressurized hydraulic fluid within the second accumulator 120 to escape to the tank 60. Once enough fluid leaves the second accumulator 120 to cause the pressure within the second accumulator 120 to fall back below the maximum back pressure, then the back pressure valve 96 may return to its closed position. Thus, excess flow in the second accumulator 120 may return to the tank 60 so that the pressure within the second accumulator 120 may be consistently maintained at or below the maximum back pressure level. It is contemplated that the maximum back pressure level may be adjusted by adjusting the biasing pressure exerted by the back pressure valve 96.

The second accumulator 120 may supply pressurized hydraulic fluid to the assist motor 132 when desired, e.g., when the assist motor 132 needs to be driven but there is not enough pressurized hydraulic fluid in the first accumulator 118 (e.g., when the pressure in the first accumulator 118 is lower than a threshold). In an embodiment, the discharge valve 130 may be shifted to a closed position and the check valve 136 may allow pressurized hydraulic fluid to flow from the second accumulator 120 to the assist motor 132, but not in the reverse direction.

The swing charge valve 128 may be configured to regulate the charging of the first accumulator 118 based on fluid pressures generated a current or ongoing segment of the excavation work cycle of machine 10, and the discharge valve 130 and the controller 110 may be configured to regulate discharging of the first accumulator 118 based on the charge level of the first accumulator 118 and the power demand on the power source 88. In particular, the swing charge valve 128 may be configured with a swing charge set pressure that may cause the swing charge valve 128 to open and direct pressurized fluid to the first accumulator 118 when the fluid pressure in the charge passage 122 exceeds the charge set pressure, and the pressure in the first accumulator 118. Further, based on input received from one or more performance sensors 138, the controller 110 may be configured to partition a typical work cycle performed by machine 10 into a plurality of segments, for example, into a dig segment, a swing-to-dump acceleration segment, a swing-to-dump deceleration segment, a dump segment, a swing-to-dig acceleration segment, and a swing-to-dig deceleration segment, as will be described in more detail below. Based on the power demand on the power source 88 during the segment of the excavation work cycle currently being performed and the charge level of the first accumulator 118, the controller 110 may selectively cause the discharge valve 130 to open and cause the first accumulator 118 to discharge, thereby assisting the power source 88 to drive the pump 58 during the acceleration segments.

Figure 3:
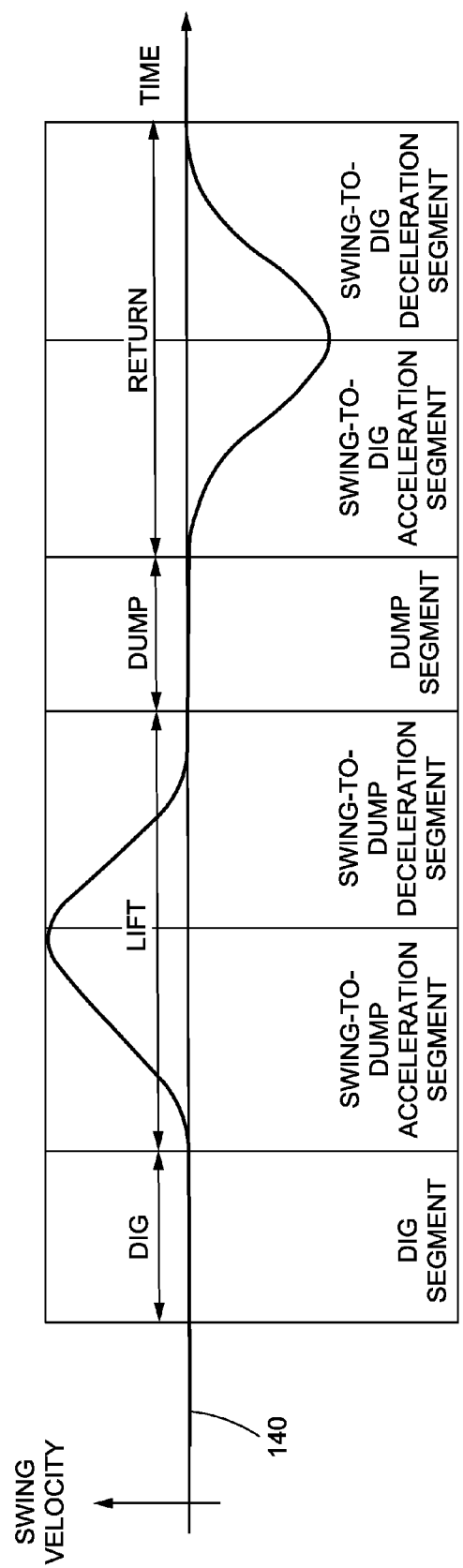
FIG. 3 is an exemplary chart of swing speed versus time through segments of an excavation work cycle.

With reference to FIG. 3, an exemplary curve 140 may represent a swing speed signal generated by the sensor(s) 138 relative to time throughout each segment of the excavation work cycle, for example throughout a work cycle associated with 90° truck loading. During most of the dig segment, the swing speed may typically be about zero (i.e., the machine 10 may generally not swing during a digging operation). At completion of a dig stroke, the machine 10 may generally be controlled to swing the work tool 16 toward the waiting haul vehicle 12 (referring to FIG. 1). As such, the swing speed of the machine 10 may begin to increase toward the end of the dig segment. As the swing-to-dump segment of the excavation work cycle progresses, the swing speed may accelerate to a maximum when the work tool 16 is about midway between the dig location 18 and the dump location 20, and then decelerate toward the end of the swing-to-dump segment. During most of the dump segment, the swing speed may typically be about zero (i.e., machine 10 may generally not swing during a dumping operation). When dumping is complete, the machine 10 may generally be controlled to swing the work tool 16 back toward the dig location 18 (referring to FIG. 1). As such, the swing speed of the machine 10 may increase toward the end of the dump segment. As the swing-to-dig segment of the excavation cycle progresses, the swing speed may accelerate to a maximum in a direction opposite to the swing direction during the swing-to-dump segment of the excavation cycle. This maximum speed may generally be achieved when the work tool 16 is about midway between the dump location 20 and the dig location 18. The swing speed of the work tool 16 may then decelerate toward the end of the swing-to-dig segment, as the work tool 16 nears the dig location 18. The controller 110 may partition a current excavation work cycle into the six segments described above based on signals received from the sensor(s) 138 and maps stored in memory, based on swing speeds, tilt forces, and/or operator input recorded for a previous excavation work cycle, or in any other manner known in the art.

The curve of FIG. 3 may correspond with a swing-intensive operation where a significant amount of swing energy is available for storage by the first accumulator 118, and use of the stored energy at particular stages of the operation to assist the power source 88 in driving the pump 58 and, correspondingly, the swing motor 49 may improve the efficiency of the machine 10. An exemplary swing-intensive operation may include a 150° (or greater) swing operation, such as the truck loading example shown in FIG. 1, material handling (e.g., using a grapple or magnet), hopper feeding from a nearby pile, or another operation where an operator of the machine 10 typically requests harsh stop-and-go commands. When configured for such operation, the controller 110 may be configured to open the discharge valve 130 and cause the first accumulator 118 to discharge fluid to the assist motor 132 during the swing-to-dump and swing-to-dig acceleration segments in response to the power demand on the power source 88 if the first accumulator 118 is charged. The swing charge valve 128 may have a charge set pressure that will allow the swing charge valve 128 to open and communicate fluid from swing motor 49 to the first accumulator during the swing-to-dump deceleration segment when the pressure in the charge passage 122 exceeds the charge set pressure.

When the machine 10 is configured to recover swing kinetic energy during the operations, the relief valve 76 and the swing charge valve 128 may be set up so that pressurized fluid will flow to the recovery valve block 116 before draining to the tank 60. The proper sequencing for opening the valves 76, 128 and charging of the first accumulator 118 may be achieved by setting the charge set pressure of the swing charge valve 128 to a value that is less than a maximum charge pressure of the first accumulator 118, and setting the relief set pressure of the relief valve 76 to a value that is greater than the maximum charge pressure. In one example, the first accumulator 118 may have a maximum charge pressure of 300 bar, the swing charge valve 128 may have a charge set pressure of 280 bar, and the relief valve 76 may have a relief set pressure of 320 bar.

During swing braking in the swing-to-dump or the swing-to-dig deceleration segments, the pressure in one of the first and second chamber conduits 90, 92 increases as fluid is discharge from the swing motor 49, and fluid flows into the charge passage 122 through the corresponding check valve 80. As long as the pressure in the charge passage 122 remains below the charge set pressure, the swing charge valve 128 and the relief valve 76 remain closed. When the pressure in the charge passage 122 reaches the charge set pressure, the swing charge valve 128 is modulated to fluidly connect the charge passage 122 to the first accumulator conduit 124 and the first accumulator 118. Between the charge set pressure and the relief set pressure, pressurized fluid will flow through the swing charge valve and into the first accumulator 118 as long as the pressure in the charge passage 122 is greater than the charge pressure in the first accumulator 118. When the charge pressure is greater than the pressure in the charge passage 122, or reaches the maximum charge pressure of the first accumulator 118, fluid will cease flowing through the swing charge valve 128. Once the pressure in the charge passage 122 reaches the relief set pressure, the relief valve 76 will open to allow the pressurized fluid to drain to the tank 60. Similar operation of the valves 76, 128 and charging of the first accumulator may occur during other stages of operation of the machine 10 when sufficient fluid pressure exists in one of the first and second chamber conduits 90, 92.

The energy stored in the first accumulator 118 can be reused to provide additional power to the power source 88 to drive the pump 58 and fluid flow to the swing motor 49 during swing-to-dump and swing-to-dig acceleration. When the controller 110 determines that operator commands from the input device 48 in the operator station 22, and/or signals from the sensors 138, indicate that the swing motor 49 is entering into an acceleration segment creating a power demand that is greater than a minimum assisted power demand on the power source 88, the controller 110 may cause the discharge valve 130 to move to an open position to discharge the fluid from the first accumulator 118 to the assist motor 132 if the current pressure in the first accumulator 118 is greater than a minimum accumulator discharge pressure. Consequently, the opening of the discharge valve 130 may be contingent upon the actual power demand on the power source 88 being sufficient to warrant reuse of the stored power and whether sufficient pressure and capacity of pressurized fluid is currently stored in the first accumulator 118, such as when the first accumulator charge pressure is greater than or equal to the minimum accumulator discharge pressure, among other factors. After discharge starts, the controller 110 may maintain the discharge valve 130 in the open position until the controller 110 determines from the sensors 112, 138 and/or the input device 48 that the power demand on the power source 88 is now less than the minimum assisted power demand, or when the sensor 112 for the first accumulator 118 indicates that the first accumulator 118 does not have a sufficient volume and/or pressure of stored fluid to provide assistance to the pump 58, i.e. when the pressure in the first accumulator is less than the minimum assist discharge pressure.

As an example, in an exemplary configuration of the hydraulic control system 50, the controller 110 may be configured with a minimum assisted power demand on the power source 88 of 25 kW and a minimum accumulator discharge pressure of 250 bar based on the size of the first accumulator 118. In general, the controller 110 will cause the discharge valve 130 to open and provide pressurized fluid from the first accumulator 118 to the assist motor 132 to assist the power source 88 when a power demand is greater than 25 kW and the first accumulator 118 is charged to a pressure of greater than 250 bar. When the operator manipulates the input device(s) 48, such as a joystick, to begin the swing-to-dump or swing-to-dig acceleration segment, the controller 110 determines the power required from the power source 88 to cause the pump 58 to provide pressurized fluid to the swing motor 49 to swing the hydraulic system 14 at the commanded rate. If the manipulation of the joystick commands a slow acceleration of the swing motor 49, the power demand on the power source 88 may be less than the 25 kW minimum assisted power demand, and the controller 110 may determine that the discharge valve 130 will not open to provide pressurized fluid to the assist motor 132.

If the manipulation of the joystick commands a faster acceleration of the swing motor 49 requiring a power demand that is greater than 25 kW, the controller 110 may determine that the power demand is sufficient to assist the power source 88 if the first accumulator 118 is charged to at least the 250 bar minimum accumulator discharge pressure. If the pressure in the first accumulator 118 is less than 250 bar, the controller 110 may determine that the discharge valve 130 will remain closed and the power source 88 will not be assisted. In contrast, the controller 110 may cause the discharge valve 130 to move to the open position in response to determining that the first accumulator 118 is charged to a pressure greater than 250 bar. With the discharge valve 130 open, pressurized fluid from the first accumulator 118 drives the assist motor 132 to create power to assist the power source 88 in meeting the power demand.

The controller 110 may be configured to determine the power output from the assist motor 132, and to reduce the power output from the power source 88 to conserve fuel such that the total power provided by the power source 88 and the assist motor 132 is equal to the power demand. The controller 110 will maintain the discharge valve 130 in the open position and continue adjusting the power output by the power source 88 as the changes in the charge level of the first accumulator 118 and the corresponding power output of the assist motor 132 may vary over time until either the power demand for the power source 88 falls below the minimum assisted power demand or the pressure in the first accumulator 118 falls below the minimum accumulator discharge pressure. For example, as the rotational speed of the hydraulic system 14 approaches the end of one of the acceleration segments, the operator may move the joystick or other input device 48 to decrease the rate of acceleration or move the hydraulic system 14 at a constant speed. These operating conditions require less power from the power source 88, and the controller 110 may determine when the power demand is less than the minimum assisted power demand and transmit control signals to cause the discharge valve 130 to move to the normally closed position.

While the illustrated and described embodiment relate to a swing hybrid system, those skilled in the art will understand that similar energy reuse strategies may be implemented through the controller 110. For example, during the dig and dump segments, the operator may not input commands for operation of the swing motor 49, but may input commands to operate one or more of the boom cylinders 28, the stick cylinder 36 and the bucket cylinder 38. Commands such as raising the boom 24 with a load of material in the work tool 16 may create a power demand on the power source 88 that exceeds the minimum assisted power demand, and the controller 110 may respond by opening the discharge valve 130 to output power from the assist motor 132 if the first accumulator 118 is charged above the minimum accumulator discharge pressure. In addition, those skilled in the art will understand that the controller 110 may be configured to evaluate the charge level of the first accumulator 118 before comparing a power demand to the minimum assisted power demand. If the first accumulator 118 is not sufficiently charged to provide power to assist the power source 88, it may be unnecessary to evaluate the power demand commanded by the operator.

The energy recovery system 114 in accordance with the present disclosure can allow reuse of stored energy at any time, and not just during swing acceleration. For example, the discharge valve 130 may be opened to discharge stored energy from the first accumulator 118 during braking of the swing motor 49 when the swing control valve 56 may provide pressurized fluid to the side of the swing motor 49 that will act against the direction in which the hydraulic system 14 is rotating. The controller 110 may open the discharge valve 130 to provide pressurized fluid to the assist motor 132, and at the same time the pressure in the charge passage 122 may cause the swing charge valve 128 to open to the first accumulator 118. When the charge pressure in the first accumulator 118 reaches a maximum charge pressure, the additional pressurized fluid from the charge passage 122 may still drive the assist motor 132 instead of wasting the excess kinetic energy from the swing motor 49 as is the case in previously known recovery systems where accumulators discharge back to the swing motor and the discharge valve cannot be opened when the charge valve is open to charge the accumulator. By doing this, the size of the first accumulator 118 may be reduced. The discharge valve 130 may also be opened to discharge stored energy during multi-function operation of other systems of the machine 10 that may be fluidly connected to the discharge valve 130 and use of the energy recovery system 114 may increase the efficiency of the machine 10. Still further, the assist motor 132 may be shared with other systems, such as a boom hybrid system of the second circuit 54, and the discharge valve 130 may be opened when such other systems require power from the assist motor 132. However, the swing system of the first circuit 52 may have a higher priority for use of the stored energy and the assist motor 132 if it requires a higher accumulator pressure than the other systems.

Figure 4:
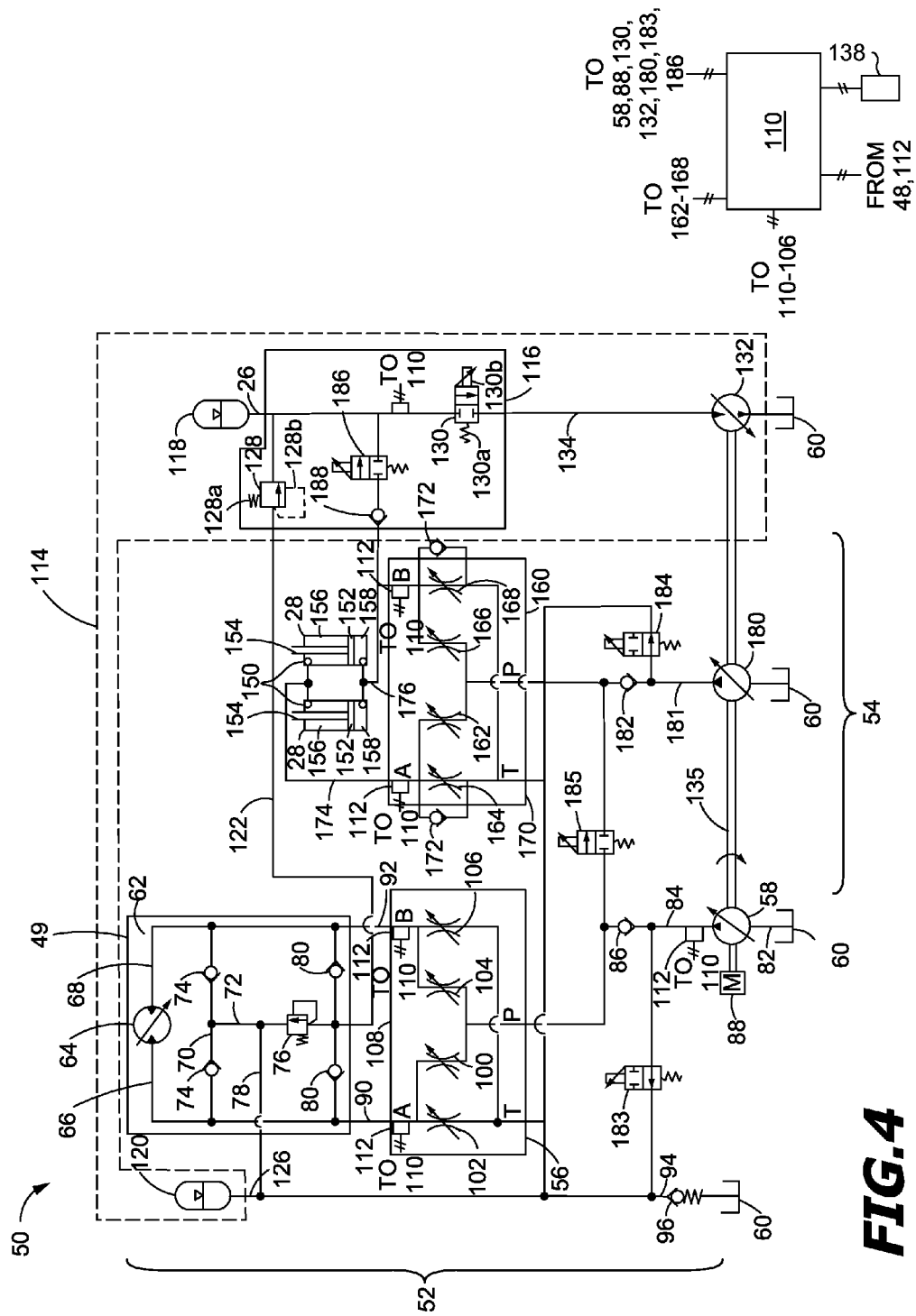
FIG. 4 is a schematic illustration of a hydraulic system with integrated swing kinetic energy and boom potential energy recovery in accordance with the present disclosure.

FIG. 4 provides one example of a hydraulic control system 50 where the swing hybrid system of the first circuit 52 shares the energy recovery system 114 with the boom hybrid system of the second circuit 54 including the hydraulic cylinders 28 that raise and lower the boom. The use of the lift cylinders 28 is exemplary, and the stick cylinder 36 and the bucket cylinder 38 may be integrated in a similar manner as described herein in addition to, or as alternatives to, the hydraulic cylinders 28. As shown in FIG. 4, each hydraulic cylinder 28 may include a housing 150 and a piston 152. The housing 150 may include a vessel having an inner surface forming an internal chamber. In an embodiment, the housing 150 may include a substantially cylindrically-shaped vessel having a cylindrical bore therein defining the inner surface. The piston 152 may be closely and slidably received against the inner surface of the housing 150 to allow relative movement between the piston 152 and the housing 150.

A rod 154 may be connected on one end to the piston 152, and on another end directly or indirectly to the boom 24, as shown in FIG. 1. The piston 152 may divide the internal chamber of the housing 150 into a rod-end chamber 156 corresponding to the portion of the internal chamber on the rod-end side of the housing 150, and a head-end chamber 158 corresponding to the portion of the internal chamber of the housing 150 opposite the rod-end side. The rod-end and head-end chambers 156, 158 may each be selectively supplied with pressurized fluid and drained of the pressurized fluid via respective apertures in the housing 150 to cause the piston 152 to displace within the housing 150, thereby changing an effective length of the hydraulic cylinders 28, which moves the boom 24. A flow rate of fluid into and out of the rod-end and head-end chambers 156, 158 may relate to a translational velocity of the hydraulic cylinders 28, while a pressure differential between the rod-end and head-end chambers 156, 158 may relate to a force imparted by the hydraulic cylinders 28 on the associated linkage structure of hydraulic system 14.

As illustrated in FIG. 4, the second circuit 54 may include a plurality of fluid components that cooperate to selectively direct pressurized hydraulic fluid into and out of one or more hydraulic actuators to perform a task. For example, in the illustrated embodiment, the second circuit 54 selectively directs pressurized hydraulic fluid into and out of the hydraulic cylinders 28 to move the boom 24 using a boom pump 180 operatively connected to the output shaft 135 of the power source 88, the tank 60 and the assist motor 132 as previously described along with a boom control valve 160 and additional components integrated into the energy recovery system 114.

The boom control valve 160 may be an independent metering valve unit, including two pump-to-cylinder ("P-C") independent metering control valves in the form of a rod-end supply element 162 and a head-end supply element 166, and two cylinder-to-tank ("C-T") independent metering control valves in the form of a rod-end drain element 164 and a head-end drain element 168 all disposed within a common block or housing 170. The P-C and C-T independent metering control valves 162, 164, 166, 168 may each be independently actuated into open and closed conditions, and positions between open and closed. Through selective actuation of the P-C and C-T control valves 162, 164, 166, 168, pressurized hydraulic fluid may be directed into and out of the rod-end and head-end chambers 156, 158 of each hydraulic cylinder 28. By controlling the direction and rate of fluid flow to and from the rod-end and head-end chambers 156, 158, the P-C and C-T control valves 162, 164, 166, 168 may control the raising and lowering of the hydraulic system 14. Additionally or alternatively, the boom control valve 160 may include one or more single spool valves (not shown), proportional control valves, or any other suitable devices configured to control the rate of pressurized hydraulic fluid flow entering into and exiting out of the hydraulic cylinders 28. One or more additional check valves 172 may be provided to assist in regulating the flow of hydraulic fluid, e.g., discharged from the pump 58 and/or the hydraulic cylinders 28.

The P-C control valves 162, 166 may be configured to direct pressurized hydraulic fluid exiting from the discharge passage 84 into the hydraulic cylinders 28. In an embodiment, the rod-end supply element 162 may selectively direct hydraulic flow into the rod-end chambers 156 of the hydraulic cylinders 28 via a rod-end chamber conduit 174 that fluidly connect the rod-end supply element 162 to the rod-end chambers 156 in parallel, and the head-end supply element 166 may selectively direct hydraulic flow into the head-end chambers 158 via a head-end chamber conduit 176 that fluidly connects the head-end supply element 166 to the head-end chambers 158 in parallel. Also, the P-C supply elements 162, 166 may be configured to fluidly connect the rod-end chambers 156 and the head-end chambers 158.

The C-T control valves 164, 168 may be configured to direct hydraulic fluid exiting from the hydraulic cylinders 28 to the tank 60. In an embodiment, the rod-end drain element 164 may receive hydraulic fluid leaving the rod-end chambers 156 and direct the hydraulic fluid towards the tank 60 via the rod-end chamber conduit 174, and the head-end drain element 168 may receive hydraulic fluid leaving the head-end chambers 158 and direct the hydraulic fluid towards the tank 60 via the head-end chamber conduit 176. The C-T drain elements 164, 168, like the P-C supply elements 162, 166, may include various types of independently adjustable valve devices. It is contemplated that both the supply and drain functions of the boom control valve 160 (i.e., of the four different supply and drain elements) may alternatively be performed by a single valve element associated with the rod-end chambers 156 and a single valve element associated with the head-end chambers 158, or by a single valve element associated with both the rod-end and the head-end chambers 156, 158, if desired.

In some embodiments, the pump 58 may be fluidly connected to the boom control valve 160 in addition to the swing control valve 56 to provide pressurized fluid to both the first circuit 52 and the second circuit 54. In such arrangements, however, the pressurized fluid is provided to both circuits 52, 54 at the same pressure. However, in most known systems, fluid is provided to the circuits 52, 54 at different pressures that are more efficient than a single pressure. This also allows for the use of two smaller pumps instead of one large pump. To facilitate independent supply of pressurized fluid to the circuits 52, 54, the second circuit 54 may include a separate boom pump 180 providing pressurized fluid to the boom control valve 160 for actuation of the hydraulic cylinders 28. The boom pump 180 may be configured to draw fluid from the tank 60, pressurize the fluid to a desired level, and discharge the fluid to the boom control valve 160 via a discharge passage 181. A check valve 182 may be disposed within discharge passage 181, if desired, to provide for a unidirectional flow of pressurized fluid from the boom pump 180 into the boom control valve 160. The boom pump 180 may be operatively connected to the output shaft 135 along with the pump 58 so that the boom pump 180 may also be driven by the power source 88 and the assist motor 132. Alternatively, the boom pump 180 may be connected to the assist motor 132 and/or the power source 88 via another mechanical arrangement, such as one or more mechanical connectors, e.g., gears, shafts, couplers, etc.

This embodiment may further include a swing pump bypass valve 183, a boom pump bypass valve 184, and a pump combiner valve 185. The bypass valves 183, 184 may be solenoid-operated, variable position, two-way valves that are movable in response to commands from the controller 110 to allow fluid from the corresponding pump 58, 180, respectively, to enter the low-pressure return passage 78 and drain to the tank 60 through the back pressure valve 96. The bypass valves 183, 184 may each include a valve element (not shown) that is moved from a normally open position at which the corresponding discharge passage 84, 181 is fluidly connected to the low-pressure return passage 78, toward a closed position at which pressurized fluid flows through the check valves 86, 182 to the control valves 56, 160. The valve elements may be spring-biased toward the open positions and movable in response to a command from the controller 110 to move to the closed positions.

It may be desirable to maintain a small fluid displacement from the pumps 58, 180 when not providing pressurized fluid to operate the swing motor 49 and the hydraulic cylinders 28 to keep the pumps 58, 180 primed, and this arrangement allows the control valves 56, 160 to be closed and the displaced fluid to drain to the tank 60 through the back pressure valve 96. When the operator manipulates the input device(s) 48 to command operation of the swing motor 49 and/or the hydraulic cylinders 28, the controller 110 will respond by transmitting control signals that will close the corresponding bypass valve(s) 183, 184, open the appropriate elements of the corresponding control valve(s) 56, 160, and increase the pressurized fluid output from the corresponding pump 58, 180. The bypass valve 183 could similarly be added to the embodiment of FIG. 2 between the discharge passage 84 and the low-pressure return passage 78, but the minimal fluid displacement is not required in all implementations.

The pump combiner valve 185 may be solenoid-operated, variable position, two-way valve that is movable in response to commands from the controller 110 to selectively combine the fluid discharged from the pump 58, 180 when the operator commands an operation requiring greater fluid flow than can be produced by either pump 58, 180 individually. The pump combiner valve 185 may include a valve element (not shown) that is moved from a normally closed position at which the fluid discharged from the pumps 58, 180 is directed to the corresponding control valve 56, 160, toward an open position at which the discharged fluid is combined and flows through the control valve 56, 160 of the circuit 52, 54 requiring the combined fluid output of the pumps 58, 180. The valve element may be spring-biased toward the closed position and movable in response to a command from the controller 110 to move to the open position. For example, raising the boom 24 with a full load of work material may require more fluid flow and power output than the boom pump 180 can provide. In response to the operator commands at the input device(s) 48 to raise the boom 24, the controller 110 may determine that the power output and fluid flow required to raise the boom 24 exceeds the maximum output of the boom pump 180. In response, the controller 110 may cause the pump combiner valve 185 to move to the open position to combine the fluid output by the pumps 58, 180, and increase the output of the swing pump 58 so that the combined output meets the power demand required to raise the boom 24. When the controller 110 determines that the power demand is reduced to a level that can be met by the boom pump 180 alone, the controller 110 may cause the pump combiner valve 185 to move to the closed position and reduce the fluid output of the swing pump 58.

In this embodiment, the energy recovery system 114 may further include a boom charge valve 186 and a check valve 188, in addition to the swing charge valve 128, the discharge valve 130 and the assist motor 132. The boom charge valve 186 may be a solenoid-operated, variable position, two-way valve that is movable in response to a command from the controller 110 to allow fluid from the head-end chambers 158 to enter the first accumulator conduit 124 (i.e., to charge the first accumulator 118). In particular, the boom charge valve 186 may include a valve element (not shown) that is moved from a normally closed position at which fluid flow from the head-end chamber conduit 176 to the first accumulator 118 is inhibited, toward an open position at which the head-end chamber conduit 176 is fluidly connected to the first accumulator 118. When the valve element is away from the normally closed position (i.e., in the open position or in another position between the normally closed position and the open position) and a fluid pressure within the head-end chamber conduit 176 exceeds a fluid pressure within the first accumulator 118, fluid from the head-end chamber conduit 176 may fill (i.e., charge) the first accumulator 118 until the fluid pressure in the first accumulator 118 reaches the lesser of the fluid pressure in the head-end chamber conduit 176 and the first accumulator maximum charge pressure. The valve element may be spring-biased toward the closed position and movable in response to a command from the controller 110 to any position between the open and the closed positions to thereby vary a flow rate of fluid from the head-end chamber conduit 176 into the first accumulator 118.

An overrunning load condition may exist when retraction is desired after the hydraulic cylinders 28 have been extended to lift a load. In the overrunning load condition, the hydraulic cylinders 28 may be retracted by the force of gravity on the hydraulic system 14 and/or the force of gravity on the load carried by the hydraulic system 14, by opening the rod-end supply element 162 and closing the head-end supply element 166 and the rod-end drain element 164. This retraction may cause movement of the pistons 152 in the direction of the respective head-end chambers 158, thus resulting in pressurized hydraulic fluid being forced out of the head-end chambers 158. The overrunning load condition may be distinguished from a resistive load condition where the hydraulic cylinders 28 must work against the weight of the hydraulic system 14 and/or the force of gravity on the load to perform a movement or operation. The resistive load condition may exist when extending the hydraulic cylinders 28, e.g., lifting the pistons 152 against the force of gravity.

The boom charge valve 186 may fluidly connect the head-end chambers 158 to the first accumulator 118. In the overrunning load condition when the controller 110 detects a command input by the operator at the input device(s) 48 to lower the boom 24, the controller may cause the boom charge valve 186 to actuate to an open position while the head-end drain element 168 may be actuated to a closed position, thus allowing pressurized hydraulic fluid exiting the head-end chambers 158 to enter (or charge) the first accumulator 118. The boom charge valve 186 may work in conjunction with the check valve 188 such that when the boom charge valve 186 is in the open position, the check valve 188 may allow pressurized hydraulic fluid to flow from the head-end chambers 158 to the first accumulator 118, but not in the reverse direction. In non-overrunning load conditions, such as the resistive load condition, the boom charge valve 186 may be in a closed position to prevent entry of pressurized hydraulic fluid exiting the head-end chambers 158 into the first accumulator 118 or vice versa.

As with pressurized fluid flowing from the swing motor 49 after the swing charge valve 128 opens, the pressure within the first accumulator 118 increases as the amount of pressurized hydraulic fluid within the first accumulator 118 increases, thus making it more difficult for pressurized hydraulic fluid to travel from the head-end chambers 158 to the first accumulator 118. Once the pressure within the first accumulator 118 equals the pressure within the head-end chambers 158, the pressurized hydraulic fluid may stop flowing from the head-end chambers 158 to the first accumulator 118. If continued movement of the hydraulic cylinders 28 is desired, the pump 58 and/or the pump 180 may supply pressurized hydraulic fluid into the rod-end chambers 156 of the hydraulic cylinders 28 via the rod-end supply element 162 to increase the pressure within the head-end chambers 158 by driving the respective pistons 152 in the direction of the head-end chambers 158. As such, the pressure in the head-end chambers 158 may be consistently maintained at a level greater than the pressure within the first accumulator 118 and the pistons 152 may function smoothly in the overrunning load condition without experiencing a stoppage.

In most implementations, the controller 110 may also cause the discharge valve 130 to move to the open position in response to a boom down command to direct the pressurized hydraulic fluid to the assist motor 132 in addition to the first accumulator 118. Depending on the size of the first accumulator 118, the pressurized fluid from the head-end chambers 158 may be more than ample to fully charge the first accumulator 118. Once the first accumulator 118 is charged, any additional boom potential energy would be wasted if the discharge valve 130 is closed. At the same time fluid exits the head-end chambers 158, fluid must be added to the rod-end chambers 156 to fill the increasing volume as the piston 152 moves downward. One alternative for filling the rod-end chambers 156 is opening the drain elements 164, 168 to allow the fluid exiting the head-end chambers 158 to recirculate through the boom control valve 160 to the rod-end chambers 156. However, with diversion of the fluid from the head-end chambers 158 through the boom charge valve 186, the fluid flowing through the boom control valve 160 may not be sufficient to fill the rod-end chambers 156, and the boom pump 180 must make up the difference. By opening the discharge valve 130, diverted fluid from the head-end chambers 158 may flow through and drive the assist motor 132 and assist the power source 88 in outputting power to the boom pump 180, and thereby capture additional boom potential energy as the boom 24 is lowered.

The second accumulator 120 may be operatively connected to the rod-end chambers 156 via the rod-end drain element 164. For example, when extension of the hydraulic cylinders 28 is desired, e.g., in the resistive load condition or other non-overrunning load condition, the rod-end drain element 164 may be actuated to an open position while the head-end drain element 168 is actuated to a closed position, thus allowing pressurized hydraulic fluid exiting the rod-end chambers 156 to enter (or charge) the second accumulator 120. Thus, hydraulic fluid exiting from the rod-end chambers 156 may be stored in the second accumulator 120 for reuse at a later time.

The back pressure valve 96 may allow passage of pressurized hydraulic fluid back into the tank 60, e.g., to regulate the pressure of pressurized hydraulic fluid stored within the second accumulator 120. For example, as previously described, pressurized hydraulic fluid leaving the rod-end chambers 156 may be directed through the rod-end drain element 164 and towards the second accumulator 120, thus creating pressure within the second accumulator 120 as pressurized hydraulic fluid is stored therein. As with pressurized fluid from the swing motor 49, the second accumulator 120 may continue to store more pressurized hydraulic fluid and the pressure in the second accumulator 120 may continue to steadily increase until the pressure within the second accumulator 120 exceeds the predetermined pressure, and the back pressure valve 96 opens to drain the pressurized hydraulic fluid within the second accumulator 120 to the tank 60. Once the pressure within the second accumulator 120 falls back below the predetermined pressure, the back pressure valve 96 may return to its closed position.

During operation of the machine 10, the operator of the machine 10 may utilize the input devices 48 to provide signals that identify a desired movement of the hydraulic cylinders 28 to the controller 110. Based upon one or more signals, including the signals from the input devices 48 and, for example, signals from various pressure, temperature, and/or position sensors 112 located throughout the second circuit 54, the controller 110 may command movement of the different valves 130, 162, 164, 166, 168, 186, 178, 188, and 96 and/or displacement changes of the pump 58 and the assist motor 132 to move the hydraulic cylinders 28 to a desired position at a desired speed and/or with a desired force. For example, the sensors 112 may be positioned and configured to determine the pressure of the fluid stored in and/or supplied to the first accumulator 118, the pressures in of the fluid stored in the rod-end chambers 156 and the head-end chambers 158, and a pressure associated with the pressurized hydraulic fluid supplied from the pump 58.

In the embodiment of FIG. 4, both the first circuit 52 and the second circuit 54 can charge the first accumulator 118 independently, and the circuits 52, 54 can also charge the first accumulator 118 at the same time. The first accumulator 118 may be sized to ensure that the performance of the boom hybrid circuit 54 is not affected. The boom hybrid circuit 54 typically operates at significantly lower pressures than the swing hybrid circuit 52, so the first accumulator may have a maximum charge pressure that is less than a maximum operating pressure of the boom hybrid circuit 54. In the exemplary system described above, the swing charge valve 128 has a charge set pressure of 280 bar, the relief valve 76 has a relief set pressure of 320 bar, and the first accumulator 118 has a maximum charge pressure of 300 bar. The integrated boom hybrid circuit 54 may operate within a pressure range of approximately 100-200 bar, so a maximum charge pressure for the first accumulator 118 of approximately 180 bar may be more appropriate. Compensation for the loss in pressure may be partially achieved by increasing the volume of the first accumulator 118. In this configuration, the reduction in the maximum charge pressure for the first accumulator 118 should not affect the braking performance of the swing hybrid circuit 52.

Both systems will be able to charge the first accumulator 118 in the manner described above, either when the swing charge valve 128 opens in response to pressure in the charge passage 122 or the boom charge valve 186 is opened by the controller 110 in response to commands from the input device(s) 48. At the same time, the discharge valve 130 may be opened to discharge fluid from the first accumulator 118 at any time that the controller 110 determines that additional power can and should be provided by the assist motor 132 to the power source 88. In this configuration, discharge of the pressurized fluid from the first accumulator 118 should not affect the performance of the swing hybrid circuit 52 in controlling the swing motor 49 and the boom hybrid circuit 54 in controlling the hydraulic cylinders 28.

Figure 5:
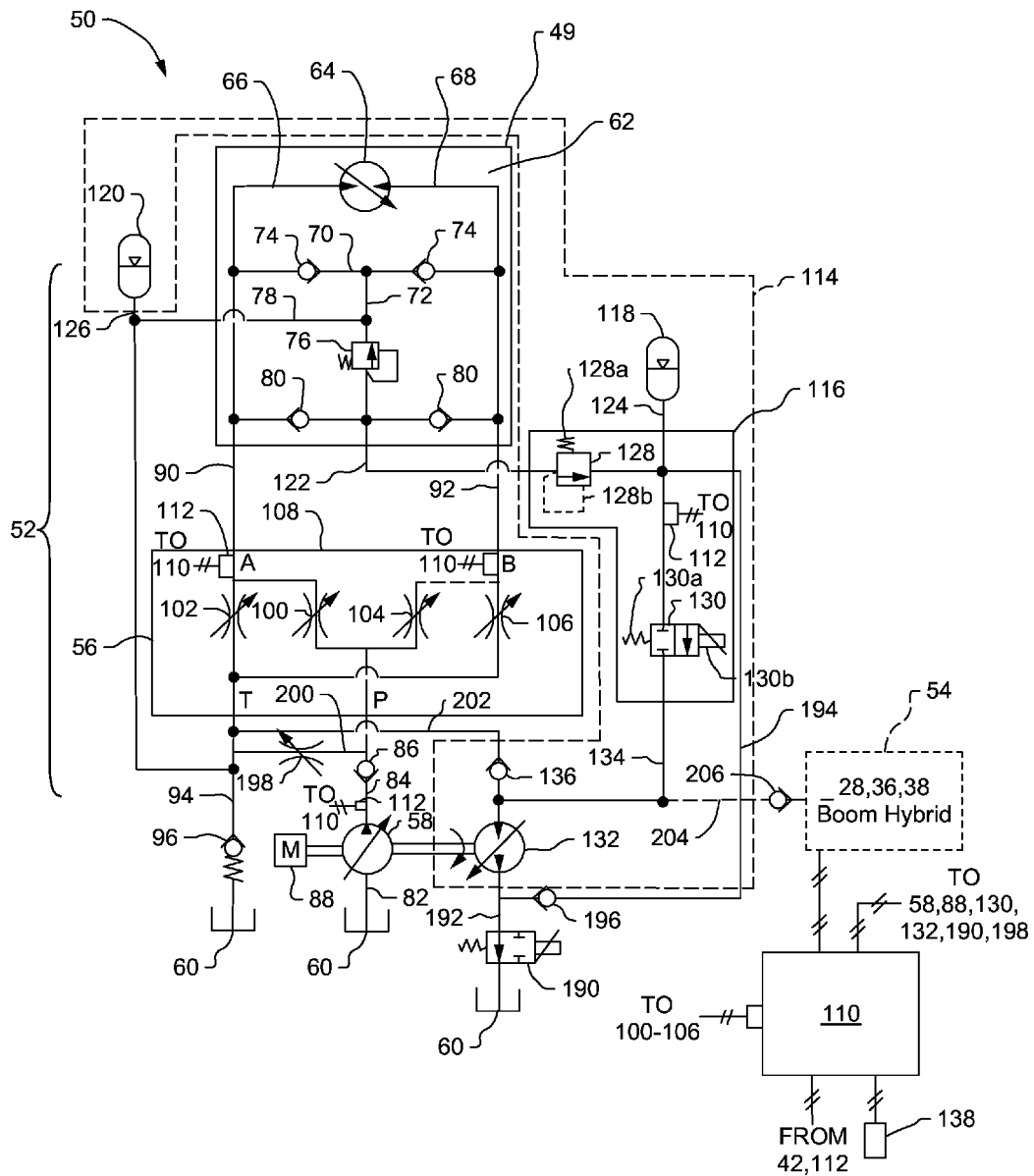
FIG. 5 is a schematic illustration of a hydraulic system with integration of swing kinetic energy recovery and engine anti-idling systems in accordance with the present disclosure.

The energy recovery system 114 in accordance with the present disclosure may facilitate a more efficient implementation of an engine anti-idling system for providing start assist to the power source 88 with minimal additional hardware components compared to known start assist systems. FIG. 5 illustrates an embodiment where the energy recovery system of the hydraulic control system 50 further includes a bypass valve 190 connected between a drain passage 192 of the assist motor 132 and the tank 60. A bypass charge passage 194 may be provided to fluidly connect the drain passage 192 to the first accumulator conduit 124, and includes a check valve 196 that prevents pressurized fluid from the first accumulator 118 from bypassing the assist motor 132 and draining to the tank 60 when the bypass valve 190 is open.

The bypass valve 190 may be a solenoid-operated, variable position, two-way valve that is movable in response to a command from the controller 110 to allow fluid from the drain passage 192 of the assist motor 132 to either drain to the tank 60 or circulate back to the first accumulator conduit 124 (i.e., to charge the first accumulator 118) via the bypass charge passage 194. In particular, the bypass valve 190 may include a valve element (not shown) that is moved from a normally open position at which the drain passage 192 is fluidly connected to the tank 60, toward a closed position at which fluid flow from the drain passage 192 to the tank 60 is inhibited and fluid flow is directed back to the first accumulator 118 through the bypass charge passage 194. When the valve element is moved to the closed position and a fluid pressure within the drain passage 192 exceeds a fluid pressure within the first accumulator 118, fluid exiting the assist motor 132 in the drain passage 192 may fill (i.e., charge) the first accumulator 118. The valve element may be spring-biased toward the normally open position and movable in response to a command from the controller 110 to the closed position to thereby cut off fluid flow from the drain passage 192 of the assist motor 132 to the tank 60.

In this embodiment, the first circuit 52 may further include a variable orifice 198 that may function in a similar manner as the bypass valves 183, 184 discussed in connection with the embodiment of FIG. 4. The variable orifice 198 may be disposed along a restart bypass passage 200 extending between the discharge passage 84 of the pump 58 and the low-pressure return passage 78, and be an independent metering control valve similar to the control valves 100, 102, 104, 106 described above that is controllable by the controller 110, or may be any other appropriate type of flow control device capable of opening and closing the restart bypass passage. The variable orifice 198 may be held open allow a small fluid displacement from the pump 58 when not providing pressurized fluid to operate the swing motor 49 to keep the pump 58 primed while the control valve 56 is closed. When the operator manipulates the input device(s) 48 to command operation of the swing motor 49, the controller 110 responds by transmitting control signals that will close the variable orifice 198, open the appropriate elements of the control valve 56, and increase the pressurized fluid output from the pump 58.

When the machine 10 is sitting idle and the operator is not issuing commands for operation of the hydraulic control system 50 to drive the swing motor 49 or change the state of the hydraulic cylinders 28, 36, 38, and other systems of the machine 10 relying on the power provided by the power source 88, the controller 110 may determine that the power source 88 is in an idle or shut down condition and may be shut down to conserve fuel. For example, the controller 110 may determine that the shutdown condition exists when no commands are input by an operator at the input device(s) 48 and detected by the controller 110 for a predetermined idle time period such as 30 seconds. Prior to shutting down the power source 88, the controller 110 may determine based on information from the sensors 112 whether the first accumulator 118 is sufficiently charged so that the first accumulator charge pressure is at least a first accumulator minimum restart pressure such that the assist motor 132 can generate enough torque to restart the power source 88. The first accumulator minimum restart pressure may be determined based on the torque required to restart the power source 88 and the pressure required the first accumulator 118 to produce the required restart torque at the assist motor 132. Consequently, the first accumulator minimum restart pressure may vary based on the sizes and efficiencies of the power source 88 and the assist motor 132, the capacity of the first accumulator 118 as well as other factors. The first accumulator minimum restart pressure may be greater than or less than the minimum accumulator discharge pressure depending on the particular implementation of the hydraulic control system 50 and the energy recovery system 114. If the fluid pressure in the first accumulator 118 is greater than the first accumulator minimum restart pressure required to restart the power source 88, the controller 110 may shut down the power source 88 until power is again required to operate the machine.

If the first accumulator charge pressure in the first accumulator 118 is less than the first accumulator minimum restart pressure and too low to restart the power source 88, the controller 110 may cause the swing hybrid circuit 52 to charge the first accumulator 118 to the first accumulator minimum restart pressure. The controller 110 may cause the bypass valve 190 to move to the closed position to redirect fluid exiting the assist motor 132 into the bypass charge passage 194. At the same time, the controller 110 may cause the control valves 100, 102, 104, 106 to close, and maintain the variable orifice 198 in the open position. The open variable orifice 198 allows fluid output by the pump 58 to circulate through a charge fluid passage 202 to the check valve 136 and the assist motor 132. The assist motor 132 is operatively connected to and driven by the power source 88 to function as a pump receiving the fluid from the pump 58 and discharging the fluid to the drain passage 192 at high pressure. The pressurized fluid is diverted to the bypass charge passage 194 by the closed bypass valve 190 to charge the first accumulator 118. The pump 58 at this point has a relatively low output fluid flow rate that may be sufficient to charge the first accumulator. However, under certain conditions, the first accumulator charge pressure may be less than an accelerated restart charge pressure below which it is more efficient increase the change rate for the first accumulator 118. In response to determining that the first accumulator charge pressure is less than the accelerated restart charge pressure, the controller 110 may temporarily up stroke the pump 58 to increase the fluid flow rate through the charge fluid passage 202 and quickly charge the first accumulator 118. When the controller 110 determines that the first accumulator charge pressure is greater than the first accumulator minimum restart pressure, the controller 110 may down stroke the pump 58 to its normal idle fluid displacement if necessary and cause the bypass valve 190 to move to the normally open position prior to shutting down the power source 88.

In embodiments where the boom hybrid circuit 54 is integrated with the swing hybrid circuit 52, the first accumulator 118 may alternatively be charged by the boom pump 180 of the boom hybrid circuit 54 as shown in FIG. 4, or by a boom accumulator (not shown) of the boom hybrid circuit 54 where the circuits 52, 54 do not share the first accumulator 118 as illustrated and described in relation to FIG. 4. In the later implementation, if the controller 110 determines that the boom accumulator of the boom hybrid circuit 54 has sufficient pressure to charge the first accumulator 118, the controller 110 may cause the boom accumulator to discharge to the discharge passage 134 via a second circuit passage 204 and a check valve 206 and into the assist motor 132. At the same time, the controller 110 may cause the bypass valve 190 to move to the closed position so that the fluid from the boom accumulator flows through the bypass charge passage 194 to charge the first accumulator 118.

Discharge control in the energy recovery system 114 is the same during restart of the power source 88 as when providing a power assist to the power source 88 when operating the swing motor 49. When the controller 110 detects a command from the input device(s) 48 requiring power from the power source 88, the controller 110 may be configured to open the discharge valve 130 and cause the first accumulator 118 to discharge fluid to the assist motor 132 to provide the power necessary to restart the power source 88. After the power source 88 is restarted, the controller 110 may cause the discharge valve 130 to move back to the normally closed position until the next instance where power is required from the assist motor 132 to assist the power source 88 in meeting a power demand.

INDUSTRIAL APPLICABILITY

The various embodiments illustrated and described herein for the energy recovery system 114 may provide improved performance in the machines 10, reduce complexity over previously known designs, and provide improved portability between machines 10 of different sizes and configurations over previously known systems. In the embodiment shown in FIG. 2, instead of discharging energy stored in the first accumulator 118 directly into the swing motor 49 as done in previous systems, accumulator energy can be used to assist the power source 88 through the assist motor 132 at any time, including when the first accumulator 118 is being charged with fluid passing through the swing charge valve 128. The flexibility in discharge timing may also allow for reduction in the size of the first accumulator 118 over prior system's accumulators. Further, the assist motor 132 may be shared with a boom hybrid system and/or an engine anti-idling system as shown in the embodiments of FIGS. 4 and 5.

The energy recovery system 114 is capable of providing more consistent braking and acceleration performance for the swing motor 49 than conventional swing hybrid systems. The cost of the energy recovery system 114 is reduced by eliminating the number of controlled valves and the accordant complexity required to be programmed into the controller 110 to execute the control strategy. This also reduces the amount of machine tuning required to transfer the technology to other machine models and sizes, and calibration is not required for the swing charge valve 128 and the discharge valve 130. Additionally, the energy reuse and recovery concept of the present disclosure may be implemented with different swing valve systems, such as independent metering valves and conventional single spool and split spool valves.

The integration of the swing hybrid circuit 52 and the boom hybrid circuit 54 is illustrated and discussed in relation to FIG. 4 may improve the hybrid system efficiency and lower its cost. The energy recovery system 114 of the swing hybrid circuit 52 may be the same as that describe in connection with FIG. 2, with the boom charge valve 186 added to the energy recovery system 114 to recover the boom potential energy. The majority of the recovered energy may come from the boom potential energy, while part of the swing kinetic energy may be lost due to the lower first accumulator maximum charge pressure. Overall, the integrated system 50 results in reduced cost through elimination of redundant elements by sharing the first accumulator 118, the discharge valve 130 and the assist motor 132. This further results in minimizing tuning of the hydraulic control system 50, and higher performance and efficiency in the integrated system 50. Moreover, the integrated system 50 of the present disclosure may be implemented with different boom control valve systems, such as independent metering valves and conventional single spool and split spool valves.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A machine, comprising:
a work tool movable through a range of motion;
a swing motor configured to swing the work tool about a vertical axis;
a hydraulic cylinder having a head-end chamber and being configured to raise and lower the work tool;
a pump selectively fluidly connected to the swing motor and to the hydraulic cylinder to provide pressurized fluid to cause the swing motor to swing the work tool and to cause the hydraulic cylinder to raise and lower the work tool;
a power source operatively connected to the pump to output power to drive the pump;
a first accumulator;
a swing charge valve having a normally closed position, an open position, and a charge set pressure, the swing charge valve being positioned to selectively fluidly connect the swing motor to the first accumulator, wherein the swing charge valve moves from the normally closed position to the open position and fluidly connects the swing motor to the first accumulator when a swing motor fluid pressure communicated to the swing charge valve from the swing motor is greater than the charge set pressure; and
a boom charge valve having a normally closed position and an open position, the boom charge valve being positioned to selectively fluidly connect the head-end chamber of the hydraulic cylinder to the first accumulator.

2. The machine of claim 1, wherein the first accumulator has a first accumulator maximum charge pressure, and the charge set pressure of the swing charge valve is less than the first accumulator maximum charge pressure.

3. The machine of claim 1, comprising:
an operator input device; and
a controller operatively connected to the boom charge valve and the operator input device, wherein:
the controller is configured to detect actuation of the operator input device; and
the controller is configured to cause the boom charge valve to move from the normally closed position to the open position to fluidly connect the head-end chamber to the first accumulator in response to determining that the actuation of the operator input device corresponds to a command to lower the work tool.

4. The machine of claim 1, comprising a boom check valve positioned between the head-end chamber and the boom charge valve and configured to permit flow of pressurized fluid from the head-end chamber to the first accumulator through the boom check valve and to prevent flow of pressurized fluid from the first accumulator to the head-end chamber.

5. The machine of claim 1, comprising:
an assist motor operatively connected to the power source;
a discharge valve having a normally closed position and an open position, the discharge valve being positioned to selectively fluidly connect the first accumulator to the assist motor; and
a controller operatively connected to the discharge valve, wherein:
the controller is configured to determine a power demand on the power source to provide pressurized fluid from the pump to operate the swing motor to swing the work tool,
the controller is configured to cause the discharge valve to move from the normally closed position to the open position to fluidly connect the first accumulator with the assist motor in response determining that the power demand on the pump is greater than a minimum assisted power demand.

6. The machine of claim 5, wherein:
the controller is configured to determine a first accumulator charge pressure of the first accumulator; and
the controller is configured to cause the discharge valve to move from the normally closed position to the open position to fluidly connect the first accumulator with the assist motor in response determining that the power demand on the power source is greater than the minimum assisted power demand and the first accumulator charge pressure is greater than or equal to a minimum accumulator discharge pressure.

7. The machine of claim 1, comprising:
a low-pressure fluid reservoir;
a relief valve having a normally closed position, an open position, and a relief set pressure that is greater than the charge set pressure, the relief valve being positioned to selectively fluidly connect the swing motor to the low-pressure fluid reservoir, wherein the relief valve moves from the normally closed position to the open position and fluidly connects the swing motor to the low-pressure fluid reservoir when the swing motor fluid pressure communicated to the swing charge valve and the relief valve from the swing motor is greater than the relief set pressure.

8. A method for recovering swing kinetic energy and boom potential energy in a hydraulic system of a machine, comprising:
providing pressurized fluid to a swing motor to cause the swing motor to swing a work tool of the machine about a vertical axis;
providing pressurize fluid to a hydraulic cylinder having a head-end chamber to cause the hydraulic cylinder to raise and lower the work tool;
sensing a fluid pressure from the swing motor at a swing charge valve;
opening the swing charge valve to fluidly connect the swing motor to a first accumulator in response to the sensed fluid pressure from the swing motor being greater than or equal to a charge set pressure of the swing charge valve and causing the swing charge valve to move from a normally closed position toward an open position;
detecting actuation of an operator input device; and
opening a boom charge valve to fluidly connect the head-end chamber to the first accumulator in response to determining that an actuation of the operator input device corresponds to a command to lower the work tool.

9. The method for recovering swing kinetic energy and boom potential energy of claim 8, wherein a first accumulator maximum charge pressure of the first accumulator is greater than the charge set pressure of the swing charge valve.

10. The method for recovering swing kinetic energy and boom potential energy of claim 8, comprising:
allowing flow of pressurized fluid from the head-end chamber to the first accumulator when the boom charge valve is in the open position; and
preventing flow of pressurized fluid from the first accumulator to the head-end chamber when the boom charge valve is in the open position.

11. The method for recovering swing kinetic energy and boom potential energy of claim 8, comprising:
providing the pressurized fluid to the swing motor with a pump of the machine;
selectively fluidly connecting the first accumulator to an assist motor via a discharge valve, wherein the assist motor is operatively connected to the pump;
determining a power demand on a power source driving the pump to provide pressurized fluid to operate the swing motor to swing the work tool; and
causing the discharge valve to fluidly connect the first accumulator with the assist motor in response determining that the power demand on the power source is greater than a minimum assisted power demand.

12. The method for recovering swing kinetic energy and boom potential energy of claim 11, comprising:
determining a first accumulator charge pressure of the first accumulator;
causing the discharge valve to fluidly connect the first accumulator with the assist motor in response determining that the power demand on the power source is greater than the minimum assisted power demand and the first accumulator charge pressure is greater than or equal to a minimum accumulator discharge pressure.

13. The method for recovering swing kinetic energy and boom potential energy of claim 8, comprising:
providing a relief valve between the swing motor and a low-pressure fluid reservoir to selectively fluidly connect the swing motor to the low-pressure fluid reservoir;

opening the relief valve to fluidly connect the swing motor to the low-pressure fluid reservoir in response to a swing motor fluid pressure communicated to the swing charge valve and the relief valve from the swing motor being greater than a relief set pressure of the relief valve.

14. An energy recovery system for a machine having a work tool movable through a range of motion, a swing motor configured to swing the work tool about a vertical axis, a hydraulic cylinder having a head-end chamber and being configured to raise and lower the work tool, a pump selectively fluidly connected to the swing motor and the hydraulic cylinder to provide pressurized fluid to cause the swing motor to swing the work tool and to cause the hydraulic cylinder to raise and lower the work tool, a power source operatively connected to the pump to output power to drive the pump; and a controller, the energy recovery system comprising:
- a first accumulator,
- a swing charge valve having a normally closed position, an open position, and a charge set pressure, the swing charge valve being positioned to selectively fluidly connect the swing motor to the first accumulator, wherein the swing charge valve moves from the normally closed position to the open position and fluidly connects the swing motor to the first accumulator when a swing motor fluid pressure communicated to the swing charge valve from the swing motor is greater than the charge set pressure; and
- a boom charge valve operatively connected to the controller and having a normally closed position and an open position, the boom charge valve being positioned to selectively fluidly connect the head-end chamber of the hydraulic cylinder to the first accumulator.

15. The energy recovery system of claim 14, wherein the first accumulator has a first accumulator maximum charge pressure, and the charge set pressure of the swing charge valve is less than the first accumulator maximum charge pressure.

16. The energy recovery system of claim 14, comprising an operator input device operatively connected to the controller, wherein:
- the controller is configured to detect actuation of the operator input device; and
- the controller is configured to cause the boom charge valve to move from the normally closed position to the open position to fluidly connect the head-end chamber to the first accumulator in response to determining that the actuation of the operator input device corresponds to a command to lower the work tool.

17. The energy recovery system of claim 14, comprising a boom check valve positioned between the head-end chamber and the boom charge valve and configured to permit flow of pressurized fluid from the head-end chamber to the first accumulator through the boom check valve and to prevent flow of pressurized fluid from the first accumulator to the head-end chamber.

18. The energy recovery system of claim 14, comprising:
- an assist motor operatively connected to the power source; and
- a discharge valve operatively connected to the controller and having a normally closed position and an open position, the discharge valve being positioned to selectively fluidly connect the first accumulator to the assist motor, wherein:
- the controller is configured to determine a power demand on the power source to provide pressurized fluid to operate the swing motor to swing the work tool, and
- the controller is configured to cause the discharge valve to move from the normally closed position to the open position to fluidly connect the first accumulator with the assist motor in response determining that the power demand on the power source is greater than a minimum assisted power demand.

19. The energy recovery system of claim 18, wherein:
- the controller is configured to determine a first accumulator charge pressure of the first accumulator; and
- the controller is configured to cause the discharge valve to move from the normally closed position to the open position to fluidly connect the first accumulator with the assist motor in response determining that the power demand on the power source is greater than the minimum assisted power demand and the first accumulator charge pressure is greater than or equal to a minimum accumulator discharge pressure.

20. The energy recovery system of claim 14, wherein the machine includes a low-pressure fluid reservoir and a relief valve having a normally closed position, an open position, and a relief set pressure that is greater than the charge set pressure, the relief valve being positioned to selectively fluidly connect the swing motor to the low-pressure fluid reservoir, wherein the relief valve moves from the normally closed position to the open position and fluidly connects the swing motor to the low-pressure fluid reservoir when the swing motor fluid pressure communicated to the swing charge valve and the relief valve from the swing motor is greater than the relief set pressure.

* * * * *